(12) United States Patent
Takeda

(10) Patent No.: US 6,831,784 B2
(45) Date of Patent: Dec. 14, 2004

(54) MULTILAYERED OPTICAL THIN-FILM FILTER, METHOD OF DESIGNING THE SAME AND FILTER MODULE UTILIZING THE SAME

(75) Inventor: Shigeki Takeda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/404,924

(22) Filed: Mar. 31, 2003

(65) Prior Publication Data

US 2004/0196557 A1 Oct. 7, 2004

(51) Int. Cl.[7] .............................................. G02B 27/00
(52) U.S. Cl. ...................... 359/579; 359/588; 359/589; 359/260; 359/577; 359/586
(58) Field of Search ................................ 359/579, 577, 359/586, 588, 589, 260; 385/16, 24

(56) References Cited

U.S. PATENT DOCUMENTS

| | | | |
|---|---|---|---|
| 5,926,317 A | * | 7/1999 | Cushing ..................... 359/588 |
| 6,018,421 A | * | 1/2000 | Cushing ..................... 359/589 |
| 6,391,400 B1 | * | 5/2002 | Russell et al. ................. 428/34 |
| 6,490,381 B1 | * | 12/2002 | Adair et al. ................... 385/16 |
| 2003/0128432 A1 | * | 7/2003 | Cormack et al. ........... 359/577 |

* cited by examiner

*Primary Examiner*—Fayez Assaf
(74) *Attorney, Agent, or Firm*—Hogan & Hartson LLP

(57) ABSTRACT

In a multilayered optical thin-film filter having multiple quarter wavelength thick optical thin films with different refractive indices, the filter includes a plurality of unit cavities that are stacked multiple times via a connection layer, each unit cavity including a first reflector layer, a spacer layer in contact with the first reflector layer, and a second reflector layer in contact with the spacer layer. The first reflector layer is a layered body and the second reflector layer is a layered body. The spacer layer is a multilayered optical thin film with a high refractive index obtained by layering even number of films, or is composed of a multilayered optical thin film with a low refractive index. The connection layer is a multilayered optical thin film with a low refractive index obtained by layering odd number of films.

3 Claims, 13 Drawing Sheets

MULTILAYERED OPTICAL THIN-FILM FILTER, METHOD OF DESIGNING THE SAME AND FILTER MODULE UTILIZING THE SAME

BACKGROUND OF THE INVENTION

1. Field of the Invention

The present invention relates to a multilayered optical thin-film filter with improved transmission phase characteristics for an optical band pass filter, particularly to an optical filter for use in wavelength division multiplexing (WDM) photonic networks (optical fiber communications networks). The present invention relates to a method of designing such an optical filter, and also to an optical filter module including such an optical filter.

2. Prior Art

In wavelength division multiplexing (WDM) photonic networks, there have been used optical add/drop multiplexers (ADM) for multiplexing a number of wavelength light signals in to an transmission optical fiber and for separating the summed signals into individual wavelengths, the function of which is implemented by use of an optical filter for wavelength segmentation.

As an example of such filters which have conventionally been used, FIG. 21 shows a multilayered optical thin-film filter which is a band-pass filter structured by laminating repeatedly sets of a reflector 97, a spacer 99, and a reflector 98 which together are composed of multiple of optical thin films such that the filter may pass only specific wavelength component light during the signal laser light passing through the multiple layers.

Although the above optical filter can be provided in the form of a relatively simple, thermally stable structure at relatively low cost, a method of designing filters with complex characteristics has not yet been established. Conventionally, such a filter is shown in FIG. 21 which has been produced by empirically finding out a layer structure such that magnitude transmission characteristics are flattened within a pass band including further stacking some cavities with reflectors 97 and 98 via a spacer 99 to sharpen the selectivity.

Generally, the filter with such simple characteristics has a layer structure symmetric to a central plane along the optical axis thereof. However, only terminal layers, which comes into contact with a substrate such as glass plate for mounting the filter, have, breaking the symmetry, a different layer arrangement or different optical constants to create due optical consistency with the substrate.

Conventionally, multilayered optical thin-film filters themselves have complicated and it is difficult to design and produce a filter considering magnitude and phase group delay time characteristics in the filter. Also no method for designing filter performance has been known.

The transmission capacity of today's photonic networks has been larger, and large-capacity networks such as D-WDM are put into practice. Though the conventional filers have satisfied only the wide selectivity, D-WDM systems requires optical filters having sharper wavelength selectivity in a narrower pass band with lower linear distortion. Although attempts have been made to achieve narrower band filtering characteristics, the filters have not been considered to reduce linear distortions. Although conventional filters satisfy wavelength selective characteristics for effective constraint of disturbing signals in the stop bands, large linear distortion has been retained unimproved which deteriorates signal quality.

Particularly, to severe applications for selecting optical signals which are modulated by high speed and signal wavelength spectra and occupy the entire pass band of the filter, dispersion characteristics of the filter cause a required signal to be subjected to a large waveform distortion, with a demodulated signal deteriorating in quality.

For more complete dispersion constraints, it is necessary to control simultaneously the group delay time characteristics and the magnitude characteristics.

SUMMARY OF THE INVENTION

It is an object of the present invention to provide an optical filter with multiple thin layer structure having low linear distortion and high selectivity characteristics.

It is still another object of the present invention to provide a designing method for designing multiple thin-film structure for creating the signal transmission characteristics to be given to the filter.

It is a further object of the present invention to provide an add/drop filter module integrated with the optical filter that is simple in structure and stable in use conditions of heat and the like.

The multilayered optical thin-film filter of the present invention is composed of multiple optical thin films having a thickness of a quarter wavelength $\lambda_0$ at a passband center and having different two refractive indices. The multilayered optical thin-film filter includes a plurality of unit cavities which are multilayered through connection layers, each connection layer being disposed between and in contact to the adjacent unit cavities. Each of the unit cavities includes a first reflector layer, a spacer layer in contact with the first reflector layer, and a second reflector layer in contact with the spacer layer. In the-unit cavity, the first reflector layer is a layered body formed by layering a plurality of first two-layer unit films each consisting of an optical thin film having a high refractive index and an optical thin film having a low refractive index in this order, while the second reflector layer is a layered body formed by layering a plurality of second two-layer unit films each consisting of an optical thin film having the low refractive index and an optical thin film having the high refractive index which are arrayed in this order, and the spacer layer is composed of a multiple layer layering an even number of optical thin films having the high refractive index, or is composed of a multiple layer laying an even number of optical thin films having the low refractive index accompanied with an odd number of optical thin films having the high refractive index on the both sides. Each of the connection layers is composed of a single or multiple layer layering an odd number of optical thin films having the low refractive index.

The present invention includes a method of designing the above multilayered optical thin-film filter. In the designing method of the multilayered optical thin-film filter according to the present invention, the layered optical filter structure is determined by defining transmission and reflection characteristics required for the optical filer by a Hurwitz polynomial in a LC filter circuitry theory, expanding the Hurwitz polynomial to a particular prototype low pass filter for electric circuits, and further conducting a frequency transform and equivalent transformations of the prototype low pass filter to the optical filter.

According to the present invention, there may be designed an optical filter with desired band pass filter characteristics, less linear distortion to a passing signal. This eliminates disturbing signals while suppressing linear distortion produced in a desired signal, thereby implementing a multilayered optical thin-film filter capable of maintaining excellent communications quality.

The present invention further includes an optical filter module with a multilayered optical thin-film filter connected in parallel with a phase shifter to an input port via a optical coupler, and the multilayered optical thin-film filter and the phase shifter are connected to an output port via another optical coupler. In this filter, an electrical length of a phase shifter portion including the couplers may be substantially different from an electrical length of transmission path portions before and after the multilayered optical thin-film filter also including the couplers by an odd integer multiplied by a quarter wavelength $\lambda_0$ at the passband center.

The optical filter module of the present invention has advantages that the magnitude characteristics and the group delay in the passband may be independently controlled, linear distortions of the signal light caused when it is passing through the filter may be restrained to a lower level, and an attenuation pole may be provided in the stop band for creating larger selective characteristics. Further, the optical filter module of the present invention has advantages that there may be obtained a filter with ideal characteristics that has high selectivity and gives less linear distortion to a passing signal regardless of the high selectivity, as a result of which disturbing signals are eliminated while the desired signal is maintained with linear distortions suppressed. Such multilayered optical thin-film filter module may be incorporated in an add/drop system.

BRIEF DESCRIPTION OF THE DRAWINGS

The present invention will be described below in detail with reference to accompanying drawings, in which.

DETAILED DESCRIPTION OF THE PRESENT INVENTION

Embodiment 1

A multilayered optical thin-film filter 6 in the embodiment includes, as components, two types of thin optical films having substantially the same thickness $\lambda_0/4$ of a quarter wavelength at the passing center $\lambda_0$ having different two refractive indices.

Figure 15:
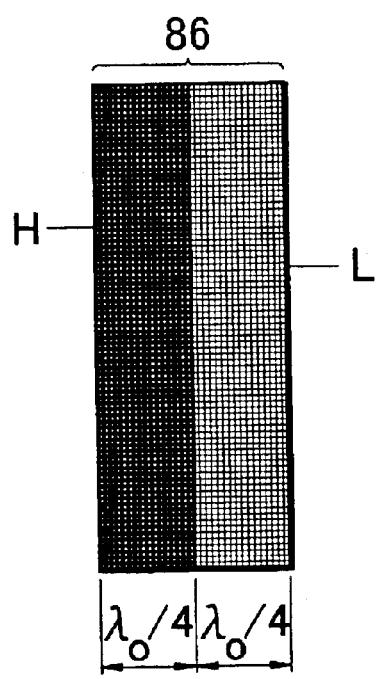
FIG. 15 is a schematic cross sectional view showing a first unit reflector layer.

In first and second reflector layers of this filter, unit optical thin films are used which are made up of a pair of two layers, which are, as shown in FIG. 15, composed of an optical thin film H with a high refractive index and a thickness of a quarter wavelength $\lambda_0$ at the passing center and an optical thin film L with a low refractive index and a thickness of $\lambda_0/4$ as a basic component.

Figure 16:
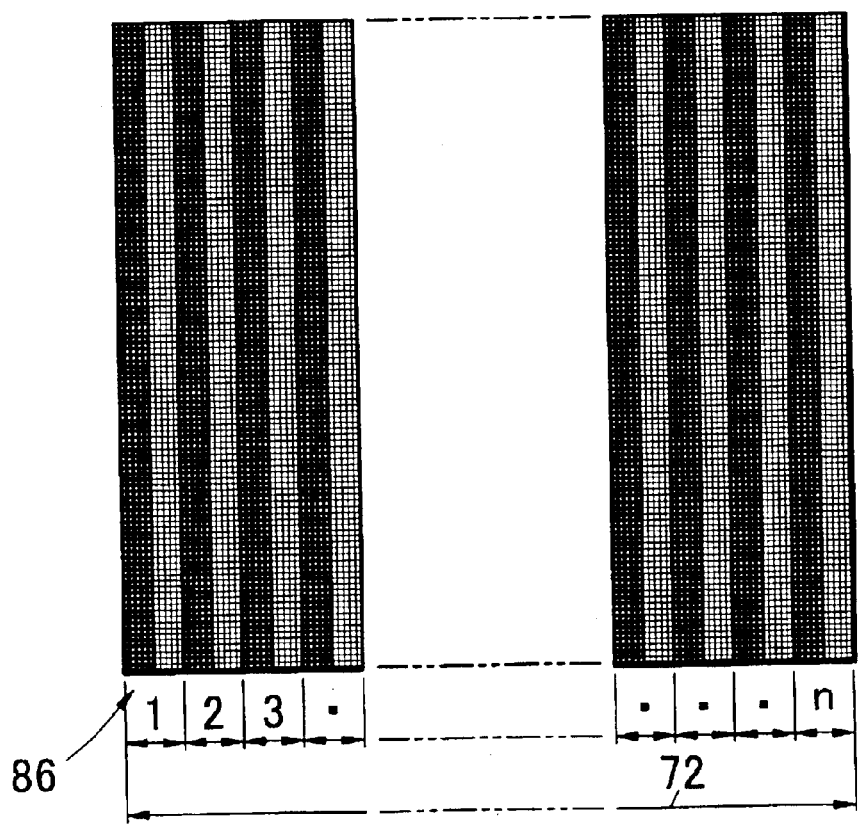
FIG. 16 is a schematic cross sectional view showing a first reflector layer obtained by layering the first unit reflector layer shown in FIG. 15 n times.

A first unit reflector layer 86 is, as shown in FIG. 15, a pair of two layers obtained by layering the optical thin film H with a high refractive index and the optical thin film L with a low refractive index in this order (HL) (for example, seen from a multilayering substrate). A first reflector layer 7 is formed by layering a number of first unit reflector layers 86 multiple times as shown in FIG. 16.

Figure 17:
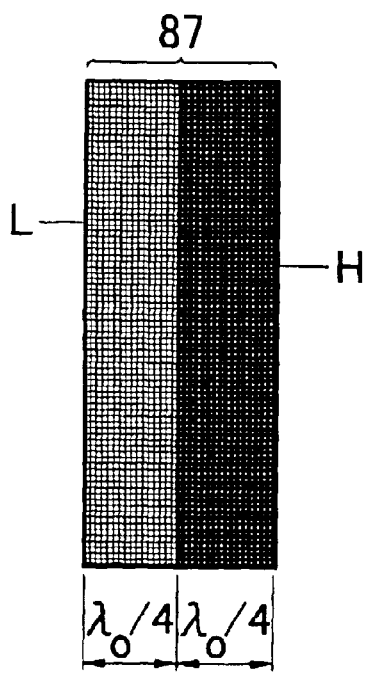
FIG. 17 is a schematic cross sectional view showing a second unit reflector layer.
Figure 18:
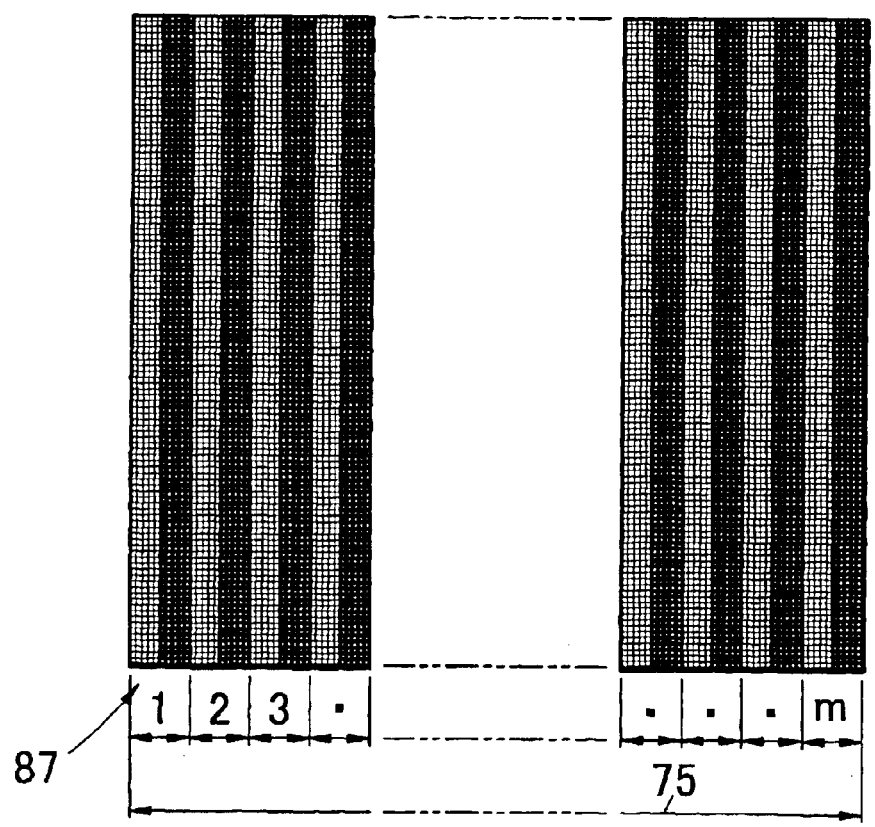
FIG. 18 is a schematic cross sectional view showing a second reflector layer obtained by layering the second unit reflector layer shown in FIG. 17 m times.

Similarly, a second reflector layer 75 is formed by layering a number of second unit reflector layers 87 multiple times as shown in FIG. 18, and each second unit reflector layer 87 is composed of a pair of two layers obtained by layering an optical thin film L with the low refractive index and an optical thin film H with the high refractive index in this order (LH) (similarly seen from the multilayering substrate) as shown in FIG. 17. The second reflector layer 75 is made up of a number of second unit reflector layers 87 disposed in LH order.

Figure 1:
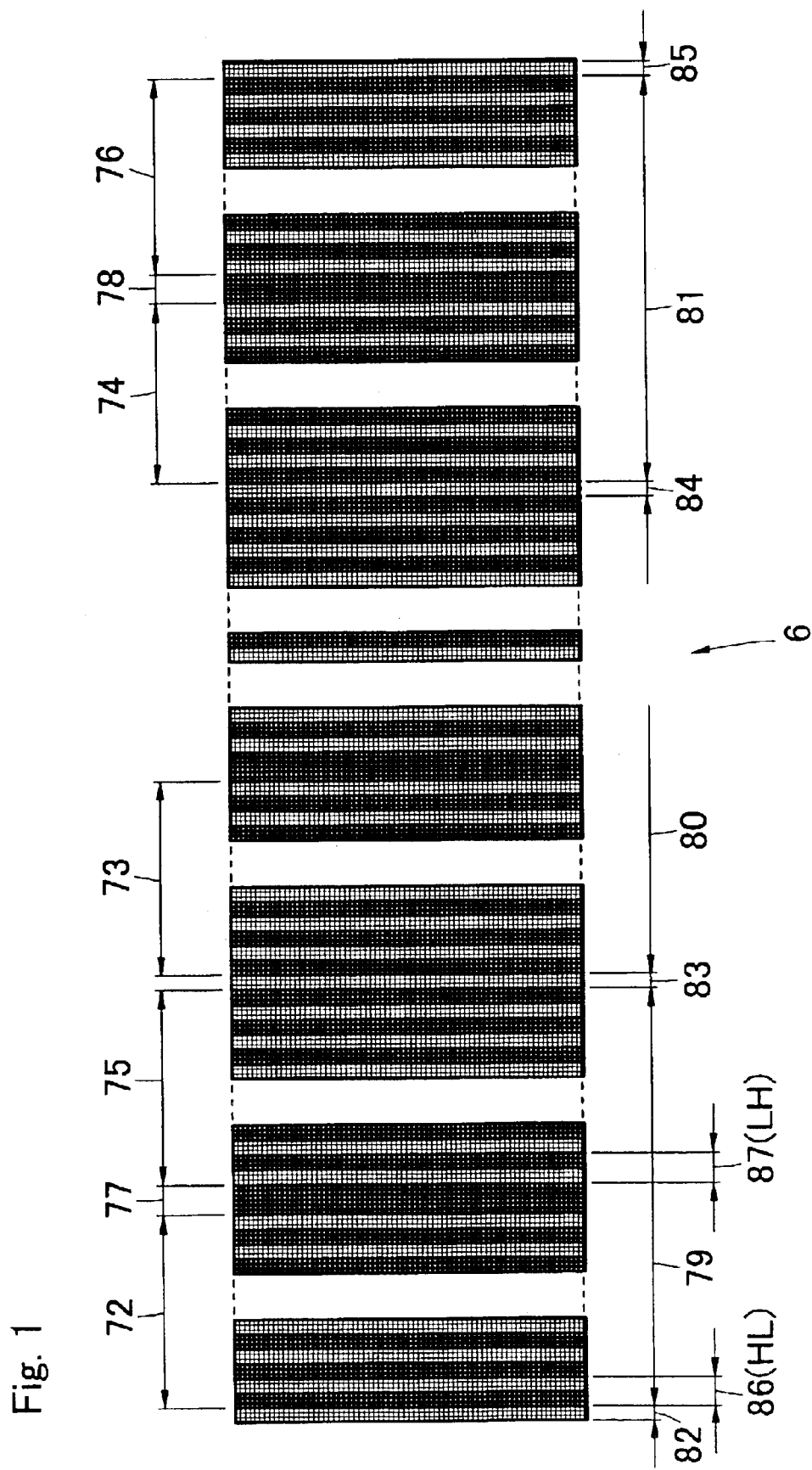
FIG. 1 is a schematically cross-sectional view showing an optical filter with multilayer structure in an embodiment of the present invention.

Further, as shown in FIG. 1, a spacer layer 77 is made from a layered body obtained by layering an optical thin film H with the high refractive index even number of times. Thus, as shown in FIG. 1, a unit cavity 79 is made from a thin-film optical filter structured by interposing the spacer layer 77 in between the first reflector layer 72 and the second reflector layer 75. Similarly, other unit cavities 80, 81 are made in the same way.

Also, a connection layer 83 is structured by layering an odd number of optical thin films L each having the low refractive index, and the unit cavities 79, 80, 81 are multi-layered via connection layers 82 to 85. Thus, a multilayered optical thin-film filter portion of the present invention is structured.

In the method of designing a multilayered optical filter according to the present invention, transmission and reflection characteristics of a filter required for practical applications are defined by a Hurwitz polynomial and an even polynomial of complex frequencies s which are usually used for the designing of LC filter circuits. From the Hurwitz polynomial and the even polynomial, element values for a prototype low-pass LC filter are determined, and a frequency transform and equivalent transformations lead the prototype low-pass LC filter to a multilayer thin-film structure of an optical filter 6 made of multiple thin films, to realize arbitrary characteristics.

Further, by adding an optical phase shifter connected in parallel to this optical filter, as described later, and by choosing appropriate electrical length and phase relation of each light signal that is joined after being branched to the multilayered optical thin-film filter 6 and to the optical path through the shifter disposed in parallel with the multilayered optical thin-film filter 6, the magnitude and the group delay times are separately controlled to minimize linear distortions.

Figure 13:
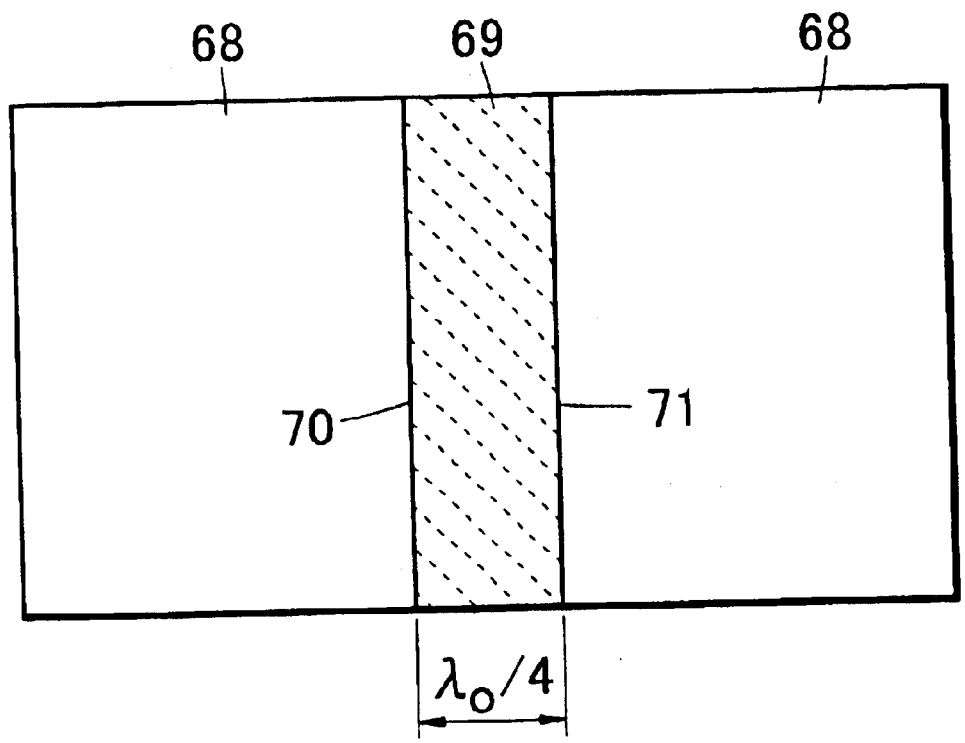
FIG. 13 is a schematic cross sectional view showing $\lambda_0/4$ thick optical material.

The detail of the designing method of a multilayered optical thin-film filter according to the present invention will be described hereinbelow. A wavelength at a passband center is referred to as $\lambda_0$, while a frequency thereof is referred to as $\omega_0$. FIG. 13 shows a $\lambda_0/4$ thick optical material layer 69 in the state of being interposed between other optical media 68, where the optical material layer 69 has a relative dielectric constant of $\in_r$ and a relative permeability of $\mu_r$, while the optical media 68 are basic media having a relative dielectric constant and a relative permeability of unity. The optical material layer 69 is a generalized expression for a basic optical thin film H or L of the present invention shown in FIG. 21.

Figure 14:
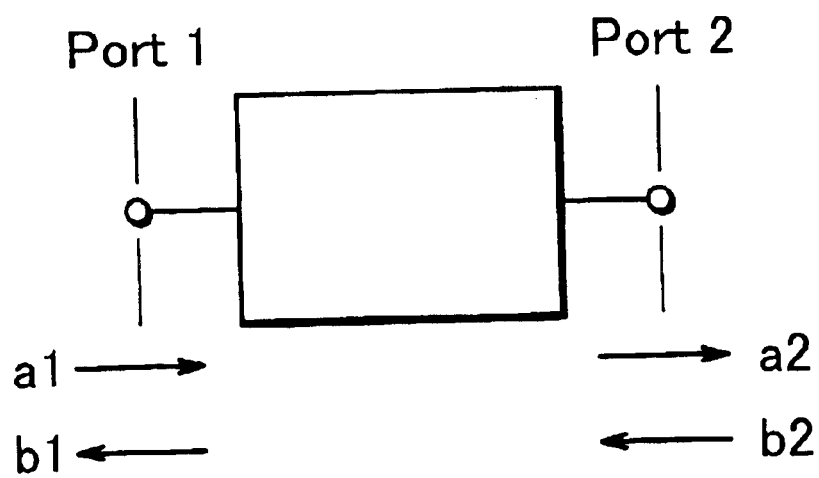
FIG. 14 is a block diagram showing with s parameter.

When light goes into a first boundary plane 70 between the optical media 68 and the optical material layer 69 perpendicularly to the plane, and comes out from a second boundary plane 71, incident amount and reflection amount in these two boundary planes may be indicated by expressing, as shown in FIG. 14, the first boundary plane 70, the first reflector layer 72, and incident waves and reflected waves in these boundary planes as a port 1 and a port 2 with s parameters, incident waves $a_1$, $a_2$, and reflected waves $b_1$, $b_2$. Here, the relation between the incident waves and the reflected waves in each port is defined by Equation 1.

$$\begin{pmatrix} b_1 \\ b_2 \end{pmatrix} = \begin{pmatrix} s_{11} & s_{12} \\ s_{21} & s_{22} \end{pmatrix} \begin{pmatrix} a_1 \\ a_2 \end{pmatrix} = (S) \begin{pmatrix} a_1 \\ a_2 \end{pmatrix} \quad 1$$

S parameters in FIG. 14 are applied to the both boundary planes of a $\lambda_0/4$ thick optical material layer 69 of FIG. 13 to obtain the S parameters as shown in Equation 2.

$$(S) = \begin{pmatrix} \dfrac{j\left(-\sqrt{\dfrac{\varepsilon_r}{\mu_r}} + \sqrt{\dfrac{\mu_r}{\varepsilon_r}}\right)\sin(\beta l)}{2\cos(\beta l) + j\left(\sqrt{\dfrac{\varepsilon_r}{\mu_r}} + \sqrt{\dfrac{\mu_r}{\varepsilon_r}}\right)\sin(\beta l)} & \dfrac{2}{2\cos(\beta l) + j\left(\sqrt{\dfrac{\varepsilon_r}{\mu_r}} + \sqrt{\dfrac{\mu_r}{\varepsilon_r}}\right)\sin(\beta l)} \\ \dfrac{2}{2\cos(\beta l) + j\left(\sqrt{\dfrac{\varepsilon_r}{\mu_r}} + \sqrt{\dfrac{\mu_r}{\varepsilon_r}}\right)\sin(\beta l)} & \dfrac{j\left(-\sqrt{\dfrac{\varepsilon_r}{\mu_r}} + \sqrt{\dfrac{\mu_r}{\varepsilon_r}}\right)\sin(\beta l)}{2\cos(\beta l) + j\left(\sqrt{\dfrac{\varepsilon_r}{\mu_r}} + \sqrt{\dfrac{\mu_r}{\varepsilon_r}}\right)\sin(\beta l)} \end{pmatrix} \quad 2$$

Next, desired characteristics for the optical filter may be completely expressed by the S parameters shown in Equation 3. The S parameters for a circuit made from a passive lossless element material may be completely expressed by three polynomials of complex frequencies S as shown in Equation 3.

$$S = \begin{pmatrix} s_{11} & s_{12} \\ s_{21} & s_{22} \end{pmatrix} = \begin{pmatrix} \dfrac{h(s)}{g(s)} & \dfrac{f(s)}{g(s)} \\ \dfrac{f(s)}{g(s)} & \dfrac{-h_*(s)}{g(s)} \end{pmatrix} \quad 3$$

Here, function g(s) refers to a Hurwitz polynomial, function f(s) refers to an even polynomial, and functions h(s) and h,(s) refer to polynomials determined from g(s) and f(s).

The reflection and transmission characteristics of the filter may be expressed by these S parameters. The transmission characteristics are particularly important, and therefore amplitude characteristics as part of the transmission characteristics are given in Equation 4, and group delay characteristics thereof are given in Equation 5.

$$A(\omega) = 20 \log(|s_{21}|) \quad 4$$

$$\tau(\omega) = \frac{\partial}{\partial \omega}(\text{Arg}(s_{21})) \quad 5$$

Figure 3:
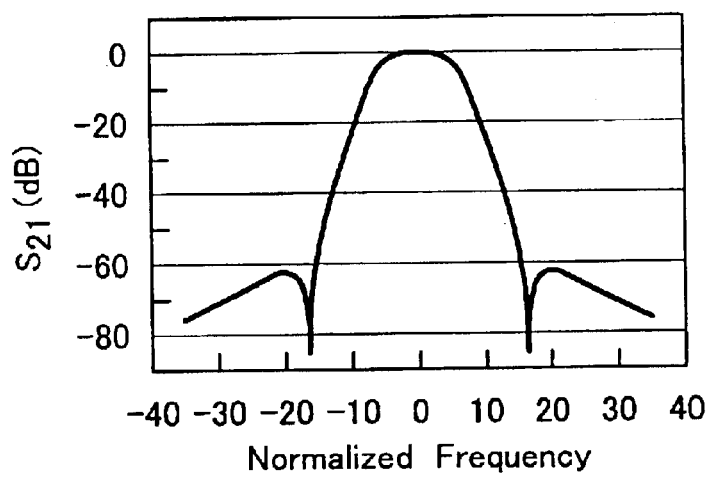
FIG. 3A is a view showing an example of ideal amplitude transmission characteristics of a prototype low pass filter.
FIG. 3B is a view showing an example of ideal group delay characteristics of a prototype low pass filter.
Figure 3:
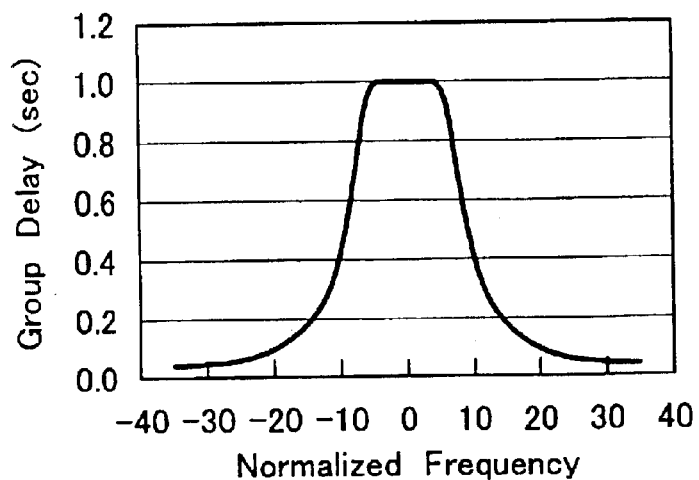

Characteristics of the ideal filter are such that sufficient attenuation is secured in the stop bands of the filter and that the magnitude and group delay characteristics in the pass band are simultaneously flat. The ideal magnitude characteristics of a prototype low-pass filter are shown in FIG. 3A, while group delay characteristics thereof are shown in FIG. 3B.

For providing a filter with characteristics shown in Equation 6, the prototype low-pass filter should have a pair of transmission zero (attenuation pole) in stop band, where numerator polynomial of a transmission coefficient $s_{21}$ is expressed by Equation 6.

$$s_{21} = \frac{f(s)}{g(s)} = \frac{b_2 s^2 + b_0}{a_4 s^4 + a_3 s^3 + a_2 s^2 + a_1 s + a_0} \quad 6$$

In Equation 7, the even polynomial of the numerator provides transmission zeros.

$$f(s) = b_2 s^2 + b_0 \quad 7$$

In the case of zeros on the imaginary axis, attenuation poles are generated in the stop band of the filter, whereas in the case of zeros on the real axis, magnitude flatness in the pass band of the filter is corrected. It is noted, however, that reference symbols $a_0$ to $a_n$ denote coefficients of a Hurwitz polynomial (noted that they are different from an incidence and a reflected waves shown in Equation 6 and FIG. 14).

The denominator polynomial and the numerator polynomial for desired filter characteristics are so determined that the thin-film optical filter has the desired characteristics as described below.

Adopting a Hurwitz polynomial having a flattened group delay characteristics in the passband for restraining linear distortion makes it possible to fulfill the required group delay characteristics. Since the numerator polynomial is an even function, its coefficients may be determined so as to enable control of the amplitude characteristics without affecting the group delay.

Hurwitz polynomials and numerator polynomials of higher degrees enable to realize of more complex characteristics. The degree n of the Hurwitz polynomial corresponds to the degree of a filter led and fulfilled thereby, i.e., the number n of resonators or unit cavities 79 to 81.

Finally targeted characteristics for a band-pass filter may be obtained by a frequency transform from the prototype low-pass filter. Such frequency transform is based on Equation 8.

$$s = j\Omega = j\frac{\omega_0}{\Delta}\left(\frac{\omega}{\omega_0} - \frac{\omega_0}{\omega}\right) \quad 8$$

Here, reference symbol $\omega_0$ denotes a center frequency of the pass band frequencies of a band-pass filter, whereas reference symbol $\Delta$ denotes a pass band width.

Figure 7:
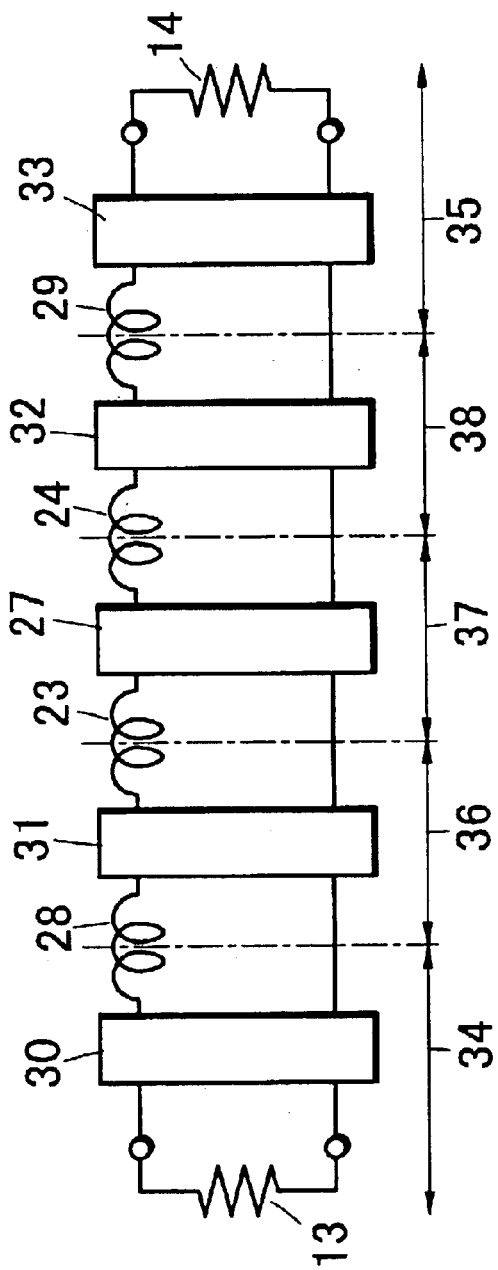
FIG. 7 is an equivalent circuit diagram with a sequentially coupled circuit portions of a prototype low-pass filter.

A circuit portion of FIG. 7 illustrates a typical prototype low pass filter without transmission zeros. Inductances 28, 23, 24, 29 of the prototype low pass filter shown in FIG. 7 are essential elements that determine characteristics of the filter. In FIG. 7, input port side and output port side are referred to as A sections 34, 35 so as to distinguish the A sections from central B sections 36, 37, 38.

Figure 8:
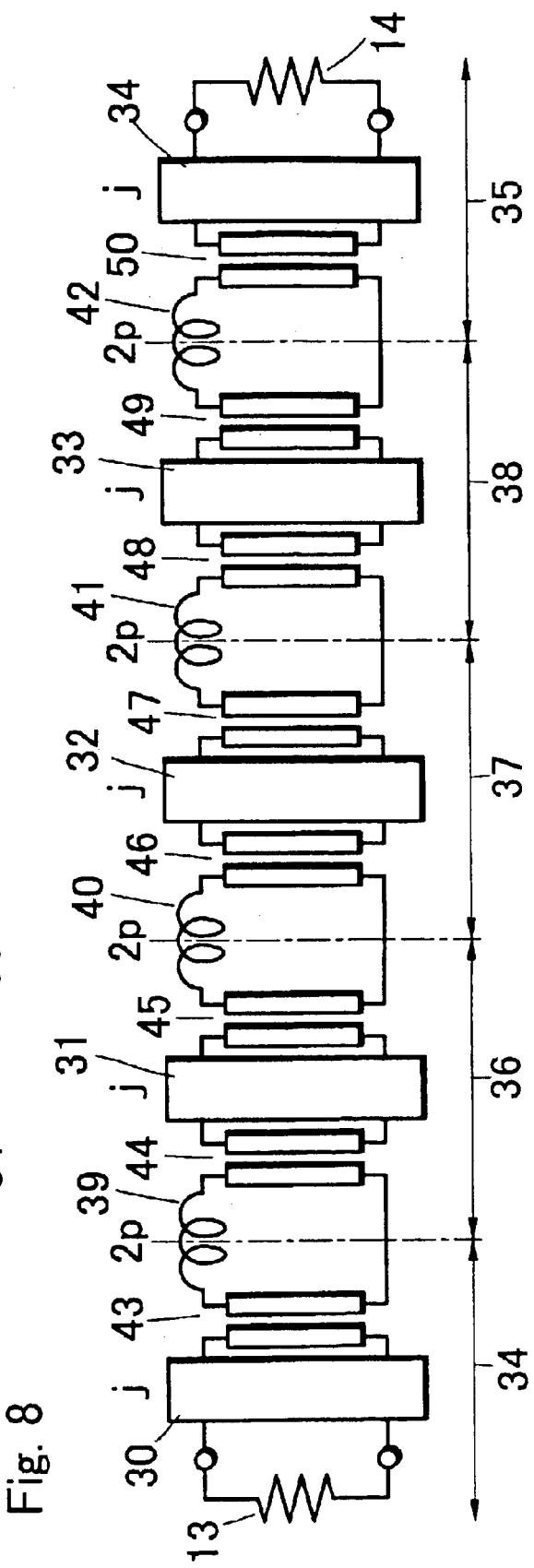
FIG. 8 is an equivalent circuit diagram of a prototype low pass filter element with impedance transformers.

An element value of each inductance in FIG. 7 is to be a feasible element value by an impedance transform. An example of the resultant equivalent circuit is shown in FIG. 8. In this equivalent circuit, each inductance 39 to 42 is interposed between transformers 43 to 50.

Figure 9:
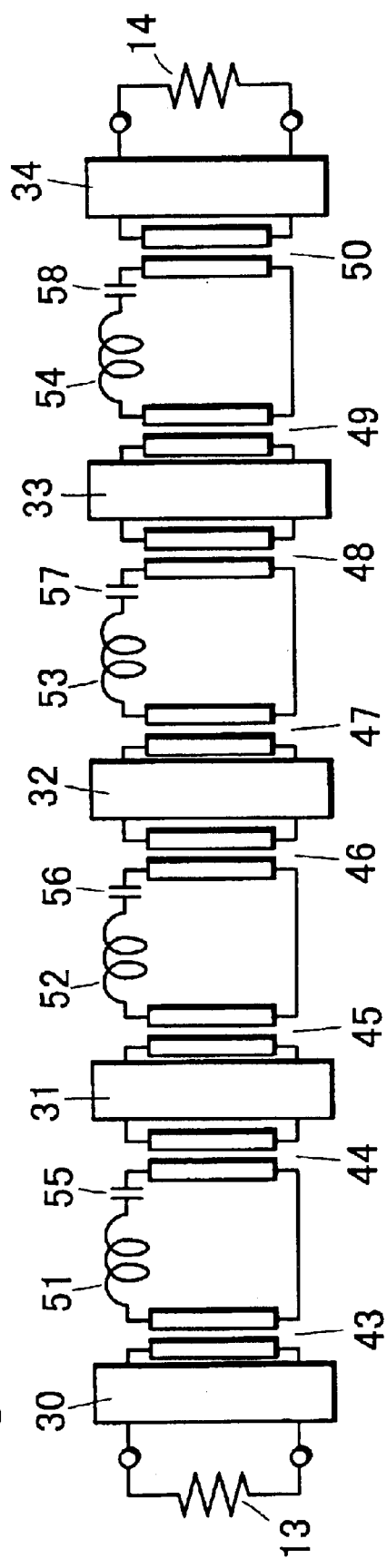
FIG. 9 is an equivalent circuit diagram of a band pass filter after a frequency transform.

Next, a frequency transform shown in Equation 8 is applied to the inductances 39 to 42 in the protoype low-pass filter to make a serial resonance circuit, so that the filter is transformed into a band-pass filter, by which a band-pass filter portion shown in FIG. 9 is obtained. At this point, if the A section 34 is transformed, the inductance 59 is transformed to a resonator inductance 60 and a resonator capacitance 61 as shown in FIG. 10A to FIG. 10B. If the B section 35 is transformed, the inductances 62, 63 are each transformed to resonator inductances 64, 65, and resonator capacitances 66, 67 as shown in FIG. 11A to FIG. 11B.

In FIGS. 10A to 11B, the reference symbol K denotes a turns ratio of a desired transformer for the impedance transform, and the reference symbol $\Delta$ denotes a pass-band width. As is clear from FIGS. 10 and 11, to fulfill a narrow fractional pass-band width $\Delta$ while maintaining reasonable element value, the turns ratio K should be increased.

Next, each circuit element in FIGS. 10A to 11B may be related to each optical thin-film layer of an optical film of FIG. 1. Transformers 43, 45, 44 shown in FIG. 10B and FIG. 11B correspond to first reflector layers 72, 73, 74 and second reflector layers 75 and 76. Resonator inductances 60, 65, 64 and resonator capacitances 61, 67, 66 forming a resonance circuit correspond to spacer layers 77 and 78. Imaginary gyrators 30, 31 correspond to connection layers 82 to 85.

Following description discusses grounds for corresponding relation between circuit elements of an equivalent circuit and constituent layers of an optical filter. It is indicated that transformers 43 to 50 with a turns ratio of 1:K or K:1 correspond to first reflector layers 72 and 74 and second reflector layers 75 and 76.

F-matrix for the transformers 43, 45 with a turns ratio of 1:K shown in FIG. 10A to FIG. 11B is expressed by Equation 9.

$$(F) = \begin{pmatrix} \frac{1}{K} & 0 \\ 0 & K \end{pmatrix} \quad 9$$

F-matrix for an optical thin film with a thickness of $\lambda_0/4$ shown in FIG. 13 is designated in Equation 10.

$$(F) = \begin{pmatrix} \cos\left(\frac{m\pi}{2}\frac{\omega}{\omega_0}\right) & j\sqrt{\frac{\mu_r}{\varepsilon_r}}\sin\left(\frac{m\pi}{2}\frac{\omega}{\omega_0}\right) \\ j\sqrt{\frac{\varepsilon_r}{\mu_r}}\sin\left(\frac{m\pi}{2}\frac{\omega}{\omega_0}\right) & \cos\left(\frac{m\pi}{2}\frac{\omega}{\omega_0}\right) \end{pmatrix} \quad 10$$

F-matrix at a central wavelength of $\lambda_0$ or a central frequency of $\omega_0$ is expressed by Equation 10 or 12.

In consideration of the fact that a wavelength band of attention is an extremely narrow band near $\lambda_0$, F-matrix in that band is almost equal to Equation 11.

$$(F)|_{\omega_0} = \begin{pmatrix} 0 & j\sqrt{\frac{\mu_r}{\varepsilon_r}} \\ j\sqrt{\frac{\varepsilon_r}{\mu_r}} & 0 \end{pmatrix} \quad 11$$

Here, as shown in FIG. 15, a relative dielectric constant and a relative permeability of an optical thin film H with a high refractive index, that is a basic optical thin film of the present invention, are referred to as $\in_H$ and $\mu_H$, while those of an optical thin film L with a low refractive index are similarly referred to as $\in_L$ and $\mu_L$. Accordingly, F-matrix of a first unit reflector layer 86 shown in FIG. 15 may be obtained by applying Equation 10 and consequently expressed by Equation 12.

$$(F)|_{\omega_0} = \begin{pmatrix} -\sqrt{\frac{\mu_H}{\varepsilon_H}}\sqrt{\frac{\varepsilon_L}{\mu_L}} & 0 \\ 0 & -\sqrt{\frac{\varepsilon_H}{\mu_H}}\sqrt{\frac{\mu_L}{\varepsilon_L}} \end{pmatrix} \quad 12$$

Figure 10:
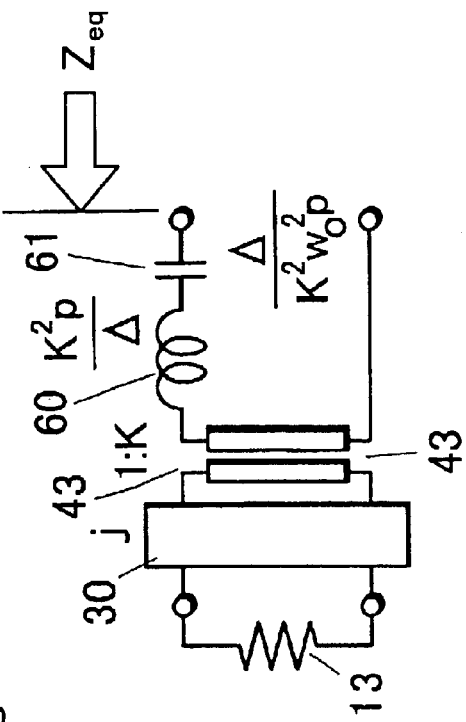
FIG. 10A is an equivalent circuit diagram of A section.
FIG. 10B is an equivalent circuit diagram of frequency-transformed A section.
Figure 10:
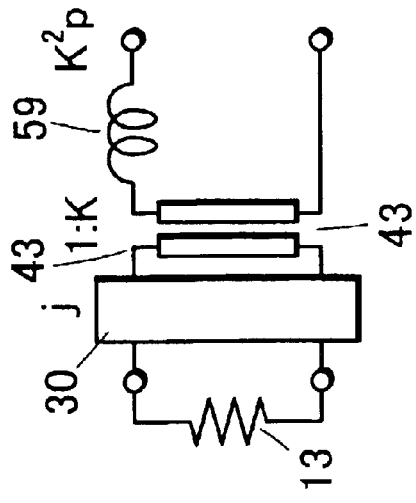
Figure 11:
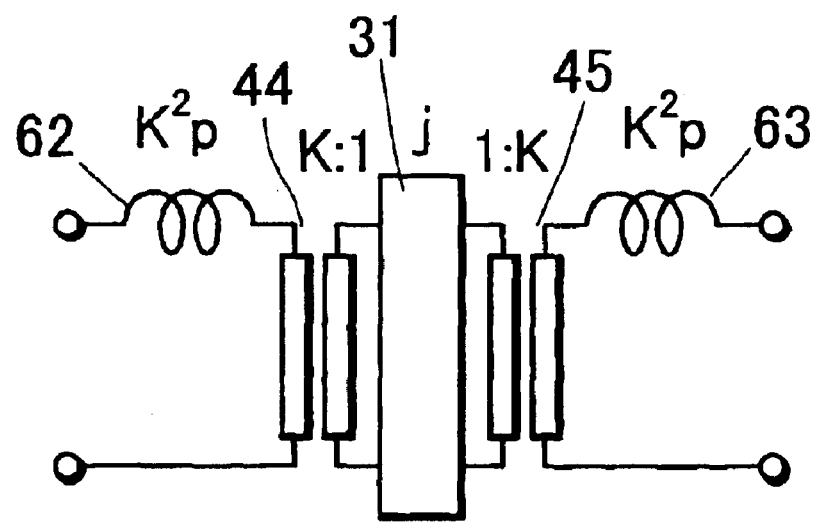
FIG. 11A is an equivalent circuit diagram of B section.
FIG. 11B is an equivalent circuit diagram of frequency-transformed B section.
Figure 11:
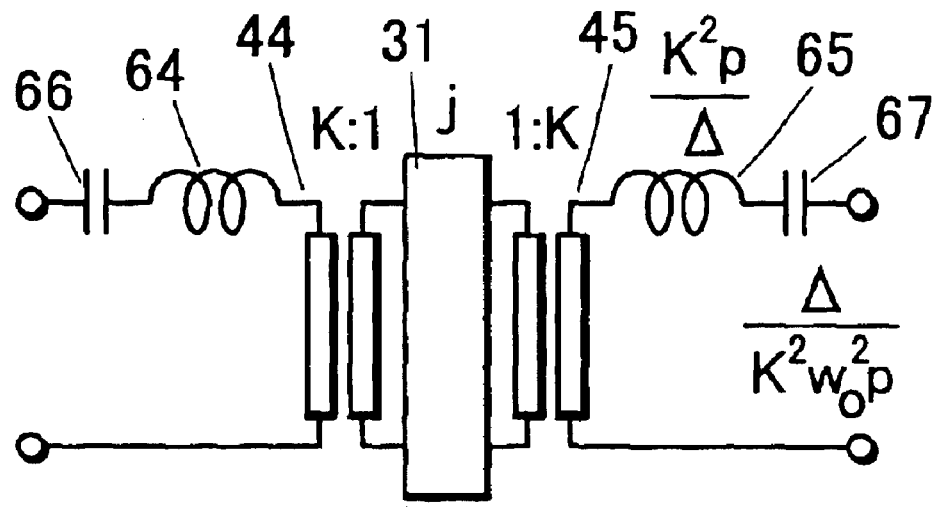

In comparison between Equations 10 and 12, it is clear that the unit reflector layer 86 shown in FIG. 15 acts as a unit element portion for the transformers 43, 45 for an impedance transform shown in FIGS. 10 and 11.

In a typical optical material layer, the refractive index of an optical thin film H with a high refractive index is 2.3, while the refractive index of an optical thin film L with a low refractive index is 1.3. If a refractive index is referred to as $n_r$, Equation 13 is obtained typically with $\mu_r=1$.

$$n_r = \sqrt{\in_r} \qquad 13$$

Equations 12 and 13 clarifies that with these refractive index values, a turns ratio of a transformer corresponding to the first unit reflector layer 86 shown in FIG. 15 is small.

In order to obtain layer structure corresponding to a transformer with a large turns ratio, a first unit reflector layer shown in FIG. 16 is multilayered. As shown in FIG. 16, when a first reflector layer 1 is formed by multilayering an n number of reflector layers, the corresponding transformer turns ratio increases into the n-th power of the turns ratio corresponding to a single transformer, in which case F-matrix is represented by Equation 14.

$$(F)|_{\omega_0} = \begin{pmatrix} \left(-\sqrt{\frac{\mu_H}{\varepsilon_H}}\sqrt{\frac{\varepsilon_L}{\mu_L}}\right)^n & 0 \\ 0 & \left(-\sqrt{\frac{\varepsilon_H}{\mu_H}}\sqrt{\frac{\mu_L}{\varepsilon_L}}\right)^n \end{pmatrix} \qquad 14$$

As a result, a turns ratio of the corresponding transformer may be increased. Multilayering of the reflector layer is repeated till a value close enough to the given turns ratio is obtained.

In exactly the same way, layer structure corresponding to the transformer 44 with a turns ratio of K:1 shown in FIG. 11B may be obtained.

F-matrix for a transformer 44 with a turns ratio of K:1 is equal to Equation 15.

$$(F) = \begin{pmatrix} K & 0 \\ 0 & \frac{1}{K} \end{pmatrix} \qquad 15$$

Similarly, a second unit reflector layer 87 shown in FIG. 17 is multilayered m times to make a second reflector layer 75 as shown in FIG. 16. Similarly, multilayering of the reflector layer is repeated till a value close enough to a the targeted turns ratio is obtained. Thus-obtained layer is used as second reflector layers 75, 76 shown in FIG. 21.

It is noted that F-matrix of the second reflector layer 75 shown in FIG. 18 is expressed by Equation 16.

$$(F)|_{\omega_0} = \begin{pmatrix} \left(-\sqrt{\frac{\varepsilon_H}{\mu_H}}\sqrt{\frac{\mu_L}{\varepsilon_L}}\right)^m & 0 \\ 0 & \left(-\sqrt{\frac{\mu_H}{\varepsilon_H}}\sqrt{\frac{\varepsilon_L}{\mu_L}}\right)^m \end{pmatrix} \qquad 16$$

Figure 21:
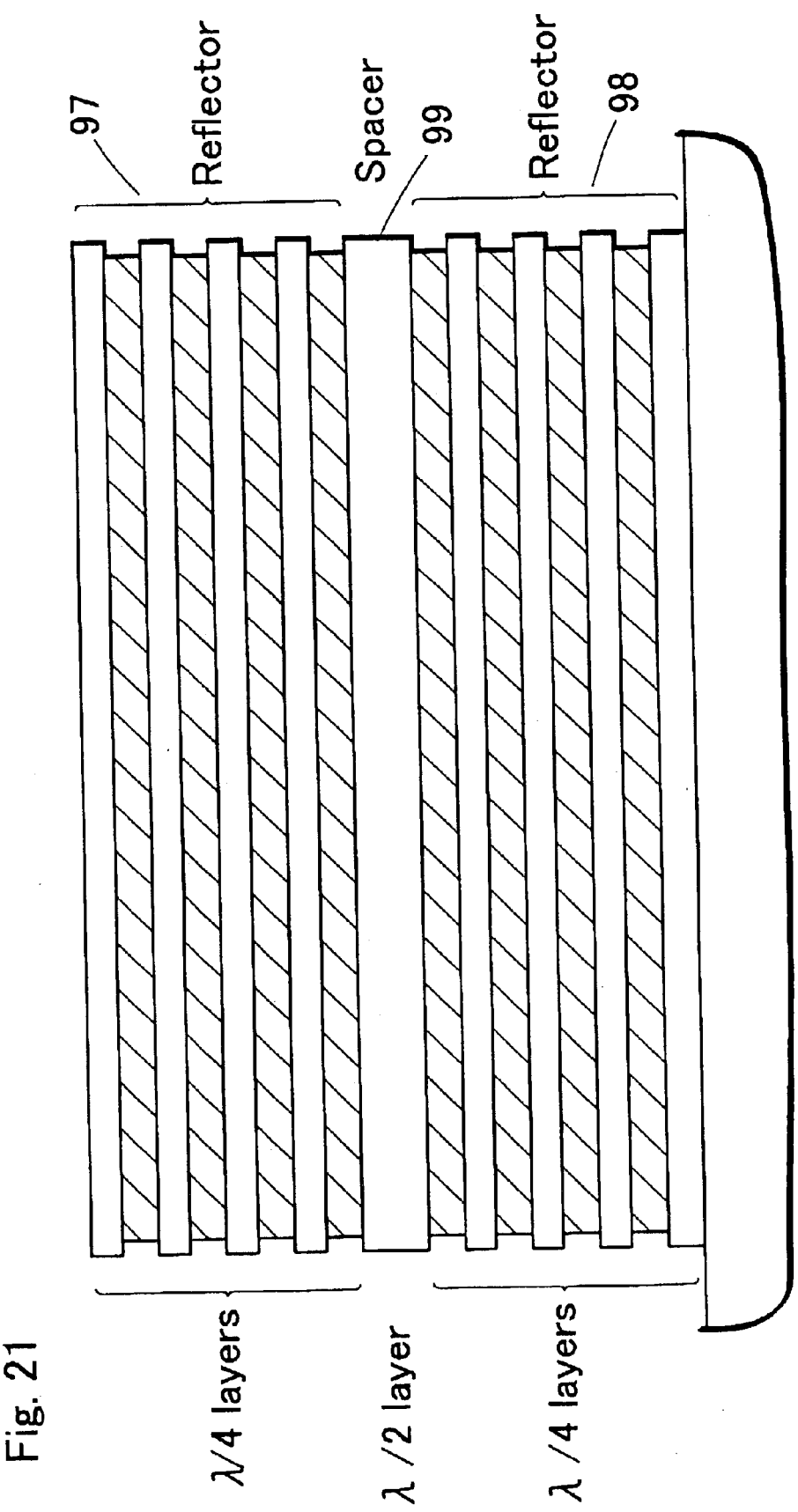
FIG. 21 is a cross sectional view showing a conventional layered thin-film optical filter.

Next, it is indicated that a resonance circuit of FIG. 9 corresponds to spacer layers 77, 78 of FIG. 21. F-matrix of B section shown in FIG. 11 is designated by Equation 17.

$$(F) = \begin{pmatrix} jps & jK^2p^2s^2 + jK^2 \\ j\left(\frac{1}{K^2}\right) & jps \end{pmatrix} \qquad (17)$$

Figure 19:
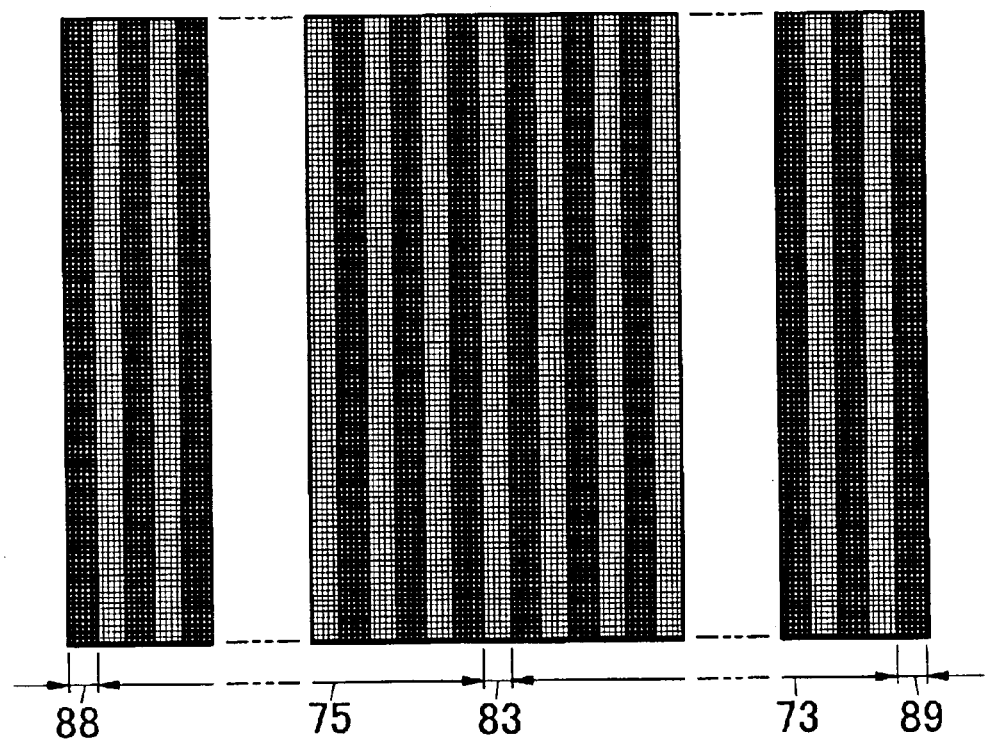
FIG. 19 is a fragmentary schematic cross sectional view showing a layer structure with characteristics equivalent to those of B section.

It is noted that at the stage of a prototype low-pass filter, an expression s=jΩ in Equation 8 is assigned to Equation 17, while at the stage of a band-pass filter after frequency transformation, s in Equation 8 is assigned to Equation 17. A corresponding layer thereto is a spacer layer, which is shown in FIG. 19 as optical thin films H 88, 89 with a thickness of $\lambda_0/4$. F-matrix of the spacer layer is shown in Equation 10.

Although detailed description is not given in here, Equation 10 may approximate to Equation 17 at the stage of a band-pass filter with high accuracy under appropriate conditions in the vicinity of the central frequency $\omega_0$.

Next, it is indicated that imaginary gyrators 27, 30 to 33 of FIG. 19 correspond to connection layers 82 to 85 of FIG. 21. F-matrix of the imaginary gyrators 27, 30 to 33 shown in FIG. 9 is equal to Equation 9. The connection layer corresponding thereto is an optical thin film L with a thickness of $\lambda_0/4$ also shown in FIG. 13. F-matrix thereof is designated by Equation 10. As with the case of the reflector layer, F-matrix with a central wavelength of $\lambda_0$ or a central frequency of $\omega_0$ is expressed by Equation 10 or 11. In consideration of the fact that a wavelength band of attention is an extremely narrow band near $\lambda_0$, F-matrix in that band is almost equal to Equation 11.

In comparison between Equations 9 and 11, it is found that Equation 11 expresses F-matrix for the circuit in which an imaginary gyrator shown in Equation 9 is combined with a transformer with a certain turns ratio.

Figure 12:
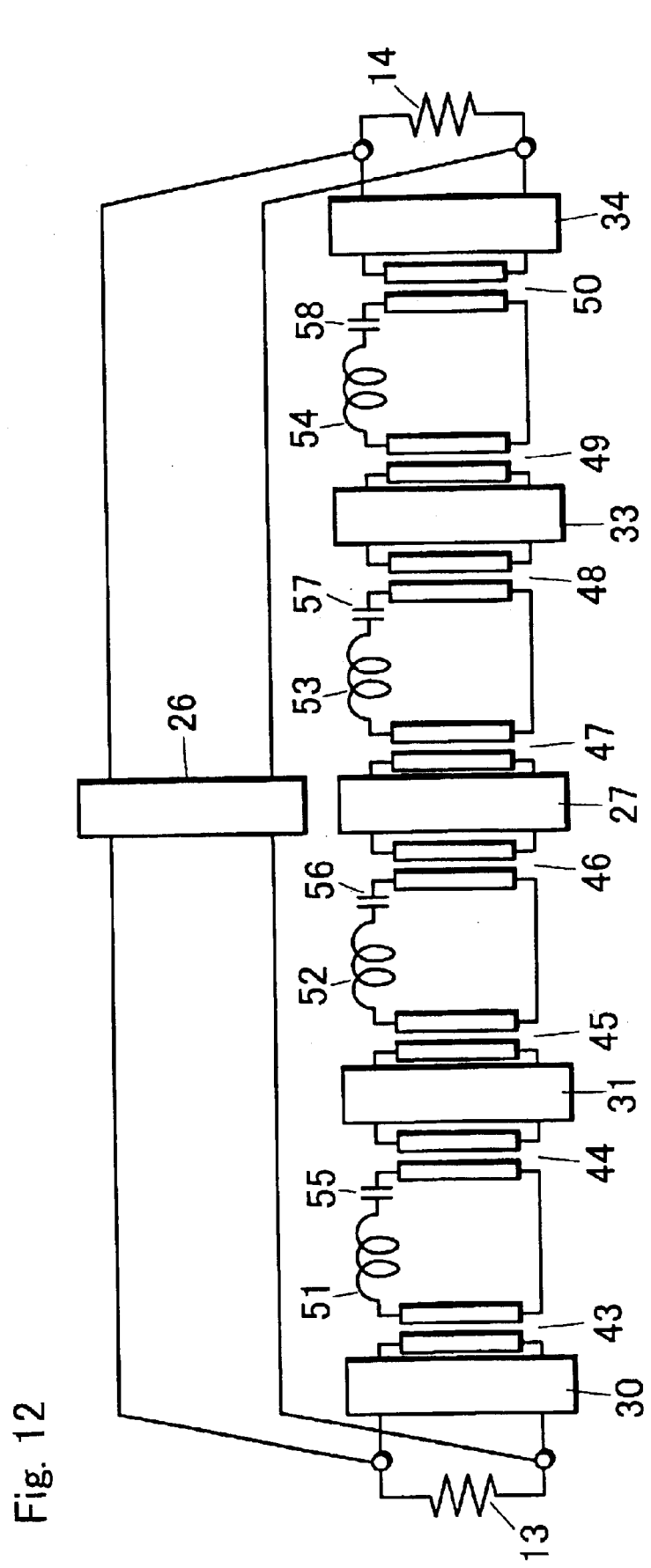
FIG. 12 is a final equivalent circuit diagram of a band pass filter.

Although detailed description is not given here, the above description implies that the impedance transform from FIG. 7 to FIG. 8 giving coefficient factors to the imaginary gyrators shown in FIG. 12 thus makes it possible to achieve the function of the imaginary gyrator with an optical thin film L with a thickness of $\lambda_0/4$.

In view of the above, B section shown in FIG. 11B may be achieved by the layer structure composed of a first reflector layer 75, a second reflector layer 73, spacer layers 88, 89, and a connection layer 83 shown in FIG. 19.

Next description will be given of the layer structure for fulfilling A section shown in FIG. 10B.

Unlike the B section, it is not possible to approximate the spacer layer shown in Equation 10 to a circuit element shown in FIG. 10 directly with high accuracy. However, as shown in FIG. 10B, if an input impedance towards the source resistance or the load resistance is observed through the A section circuit, and is denoted as $Z_{eq}$, the impedance for the layer structure corresponding thereto may be approximated.

Figure 20:
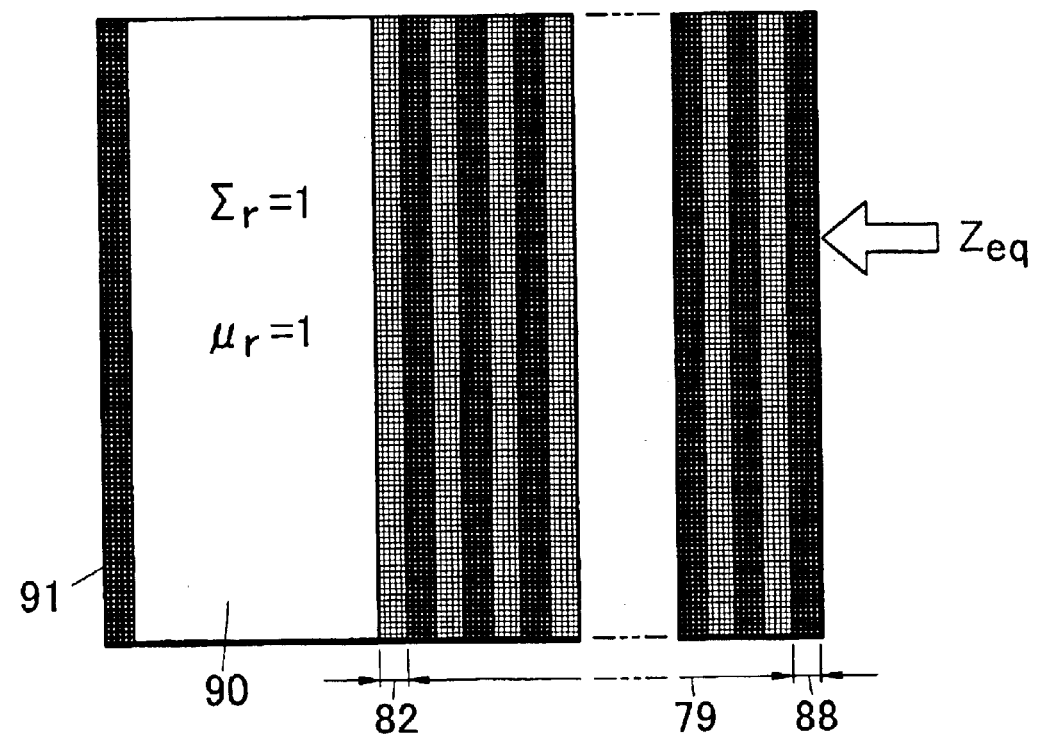
FIG. 20 is a fragmentary schematic cross sectional view showing a layer structure with characteristics equivalent to those of A section.

More specifically, as shown in FIG. 20, the layer structure composed of a first reflector layer 79, a spacer layer 87, and a connection layer 82 is connected to an ideal absorber 91 via an optical material substrate 90 with a relative dielectric constant $\in_r=1$ and a relative permeability $\mu_r=1$, so that the input impedance for a section shown in FIG. 10B may be approximated with high accuracy. Detailed description on derivation of the layer structure is not presented here.

In summary, the prototype low-pass filter shown in FIG. 7 may be fulfilled by unit cavities 79, 80, 81 and connection layers 82 to 85 in the form of a multiple thin-film optical filer shown in FIG. 21. In the example of FIG. 21, each of the connection layers 82 to 85 is a single layer made of the optical thin film L. In forming a unit cavity by connecting an A section to a B section, or a B section to another B section, adjacent spacer layers 87, 88 are so structured as two optical thin films H directly layered as (HH), so that each of the spacer layers 87, 88 constitutes a spacer layer having a thickness of $\lambda_0/2$ to form a Fabry-Perot resonator.

As is clear from Equation 11, the connection layers 82 to 85 may be also obtained by multilayering the optical thin films L in odd number of times. The spacer layers 87, 88, 89 forming cavities may be also achieved by layering the optical thin films H in an even number of times.

According to such designing method of the present invention, there may be provided a multiple optical thin-film filter having a layer structure symmetric when viewed from a central layer of the filter.

In this case, the optical thin films with different refractive indices on the side of an input port from a center of the multilayered optical thin-film filter are disposed symmetrically with optical thin films on the side of an output port from the center, and either port face of the multilayered optical thin-film filter is connected onto a transparent substrate.

On the other hand, the filter may have another layer structure offset from any symmetry.

Figure 4:
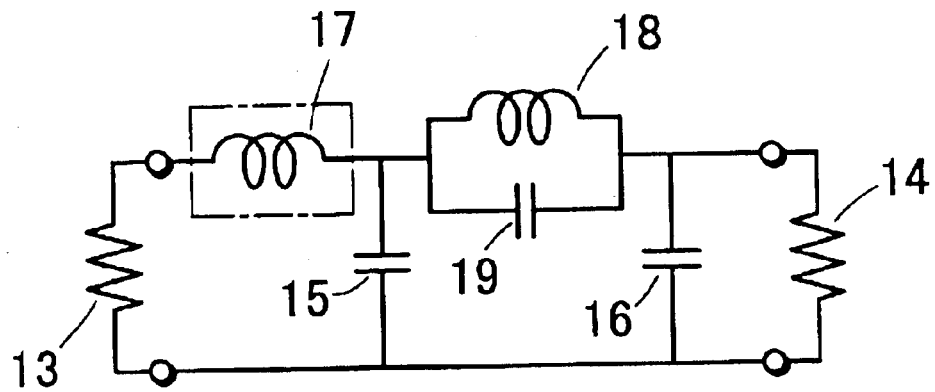
FIG. 4A is an equivalent circuit diagram of a prototype low pass LC circuitry filter.
FIG. 4B is an equivalent circuit diagram of a prototype low pass filter with an imaginary gyrator.
Figure 4:
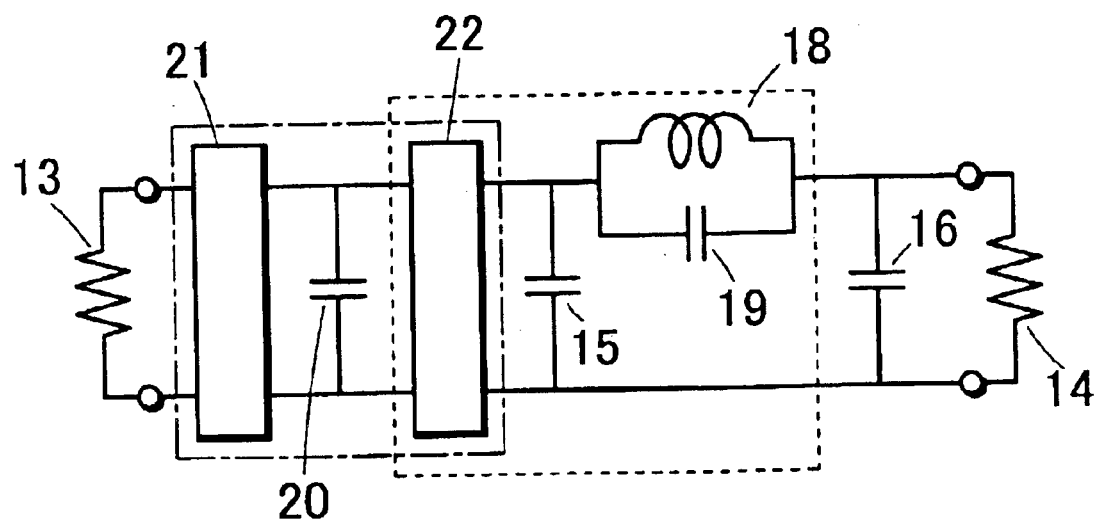

According to the electrical network synthetic theory, first, a Hurwitz polynomial of the denominator and an even polynomial of the numerator for desired transmission characteristics are given so that a prototype low-pass LC filter is synthesized from Equation 6 based on network synthesis theory as shown in FIG. 4A.

The prototype low-pass LC filter is composed of capacitances 15, 16 and 19 and inductances 17 and 18, and is connected to the signal resistance 13 and the load resistance 14. The inductance 18 and the capacitance 19 constitute a parallel resonance circuit to form transmission zero. The transmission zero corresponds to zero in Equation 7.

Figure 5:
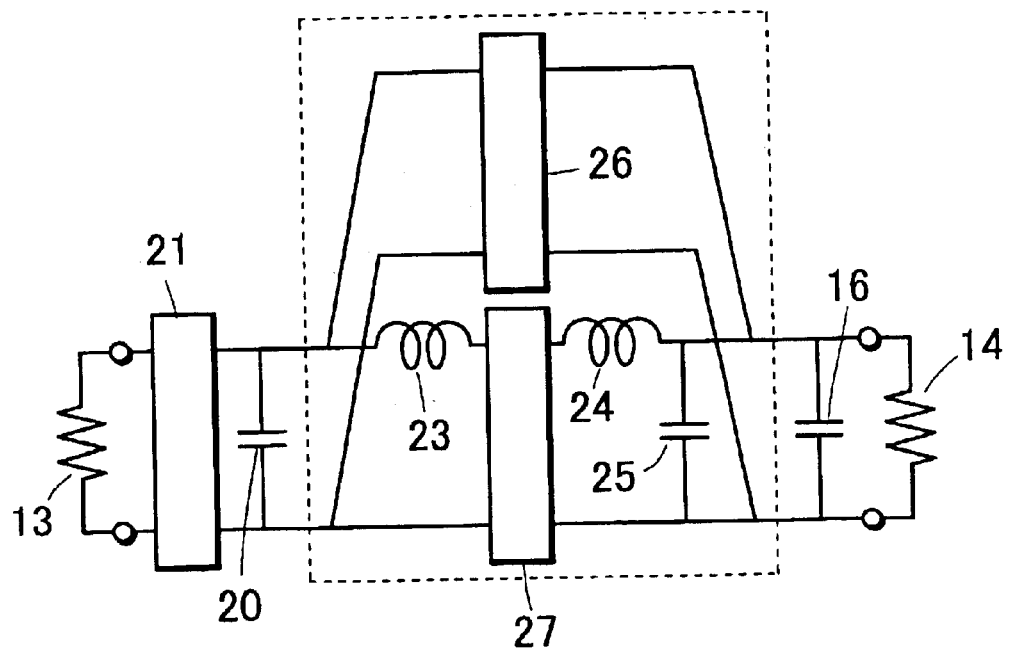
FIG. 5 is an equivalent circuit diagram of a prototype low pass filter with cross coupling.

It is convenient to equivalently transform an equivalence circuit of the LC filter shown in FIG. 4A to a prototype low-pass filter circuit shown in FIG. 4B in anticipation of the finalized structure of the thin-film optical filter. In FIG. 4A, an imaginary gyrator is connected to the both sides of the inductance 17 connected in series to the left terminal so that the inductance 17 is converted to a parallel capacitance 20. A circuit portion of a parallel resonance circuit containing an imaginary gyrator enclosed by a broken line in FIG. 4B, which produces a transmission zero, may be equivalently transformed to a circuit portion including cross coupling by an imaginary gyrator 26 also enclosed by a broken line in FIG. 5. The sign of the imaginary gyrator 26 is determined by whether zero in Equation 7 is on the imaginary axis or on the real axis. Further in FIG. 5, all the parallel capacitances 20, 25, 16 are equivalently transformed to serial inductances by use of an imaginary gyrator in an equivalent circuit shown in FIG. 6. In this transformation process, the capacitances 20, 25, 16 in FIG. 5 are transformed to the inductances 28, 29 in FIG. 6, and an imaginary gyrator 21 on the left side of FIG. 5 is eliminated in FIG. 6 since it has no effect on the transmission characteristics, by which the equivalent circuit is simplified.

F-matrix for the imaginary gyrator in FIG. 4B to FIG. 12 is expressed by Equation 18.

$$(F) = \begin{pmatrix} 0 & j \\ j & 0 \end{pmatrix} \quad (18)$$

Embodiment 2

Figure 2:
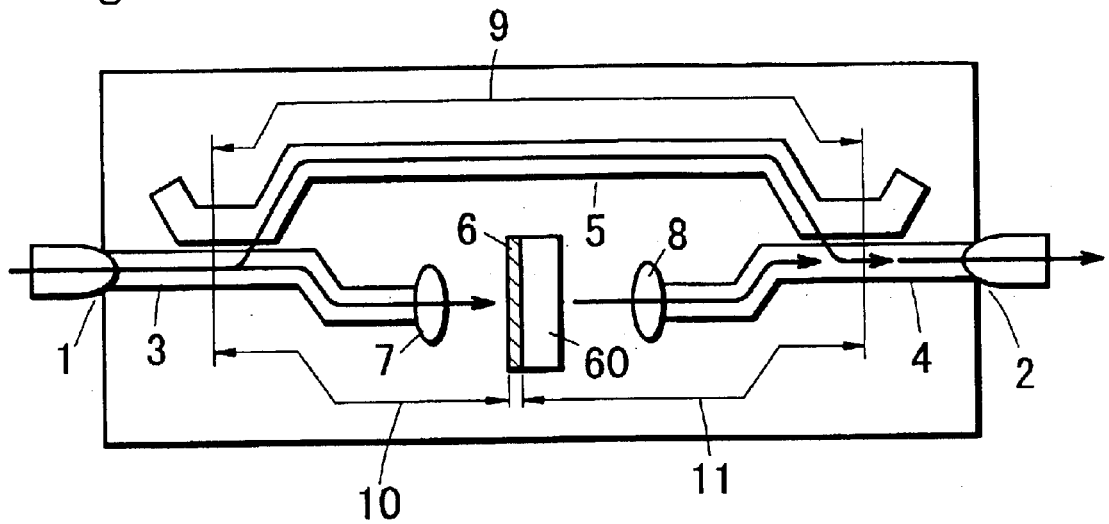
FIG. 2 is a view showing one example of an optical filter module of the present invention.

FIG. 2 is a view showing an optical filter module, which is composed of a multilayered optical thin-film filter 6 and an optical path 5 as a phase shifter that is branched and joined in parallel with the multilayered optical thin-film filter 6.

In the present embodiment, an input port and an output port are each connected to optical couplers, and branching terminals of these two optical couplers are connected to the multilayered optical thin-film filter 6 and the optical path 5.

An optical input signal at port 1 is branched off to two signals by a coupler 3: one travels through an optical path 5 with an electrical length of 9 and joins with the other in a coupler 4, while the other is collimated by a collimate optical system 7, subjected to wavelength selection by the multilayered optical thin-film filter 6, passes again through a collimate optical system 8, and then joins with the one in the coupler 4. The joined signal is fed from port 2.

With a wavelength of a passing signal being $\lambda_0$, the sum of the electrical length 10, 11 of the collimate optical systems 7, 8 is different from the electrical length of the optical path 5 by an odd multiple of $\lambda_0/4$. The difference of the electrical length makes it possible to provide an attenuation pole in a stop band or to implement adjustment for making magnitude characteristics in a pass band flat as described later.

Figure 6:
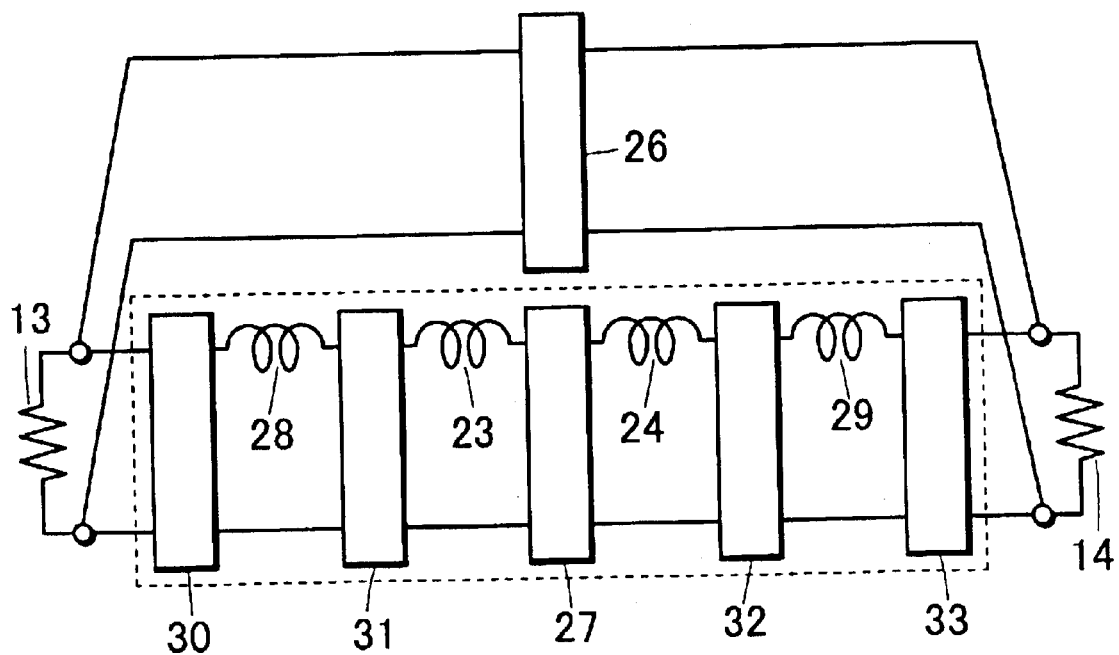
FIG. 6 is an equivalent circuit diagram of a prototype low pass filter whose element is all equivalently transformed into inductors.

In the above circuit transformation, F-matrix for the imaginary gyrator 26 for a cross coupling of FIG. 6 is expressed by Equation 9. In the embodiment shown in FIG. 2, an optical path between the couplers 3 and 4 forms a cross coupling. F-matrix for this optical path is approximated with that for optical thin films and optical wave guides, and therefore designated by Equation 10. Consequently, the electrical length of the optical path is set to be a length for achieving an imaginary gyrator of an objected sign, i.e., an odd integer multiplied by $\lambda_0/4$, and a coefficient of the imaginary gyrator is adjusted by the coupling factor of the couplers 3, 4, so that the equivalent circuit of FIG. 12 may be fulfilled in the embodiment of FIG. 1.

In that case, if the electrical length of the optical path 5 is selected so as to be almost equal to the electrical length of the optical paths before and after the multilayered optical thin-film filter 6, a bandwidth of a transmitted signal becomes at best around 100 GHz, which is $\frac{1}{2000}$ or less of about 200 THz carrier frequency of light, so that frequency dependency in a use band is negligible, thereby achieving the function of an imaginary gyrator.

This cross coupling may fulfill numerator polynomial of Equation 7 and therefore Equation 6, which makes it possible to control transmission characteristics of the filter, to provide transmission zero (attenuation pole) in the stop band by selection of the sign, and/or to flatter magnitude characteristics in a pass band.

According to the optical filter of the present invention, the optical filter structure is designed by specifying transmission and reflection characteristics needed for a desired optical filer by a Hurwitz polynomial, deriving a particular prototype low-pass filter from the Hurwitz polynomial, and further giving an equivalent circuit, for precisely fulfilling an optical filter with desired characteristics. Further, adding cross couplings enables more delicate control of transmission characteristics, and/or makes it possible to provide transmission zero (attenuation pole) in a stop band and to flatten amplitude characteristics in a pass band.

As a result, the filter of the invention provides good, desired performance characteristics including high wavelength selectivity and less linear distortion to a passing signal without adverse effects to the high selection characteristics, which effectively eliminates undesired signals while preventing linear distortions exerted to a desired signal, thereby implementing an optical filter module capable of maintaining higher communications quality.

What is claimed is:

1. An optical module of a multilayered optical thin-film filter composed of multiple optical thin films with a thickness of quarter wavelength $\lambda_0$ at a passband center and with different two refractive indices, wherein the multilayered optical thin-film filter comprises a plurality of unit cavities which are stacked through connection layers, each connection layer being disposed between and in contact to the adjacent unit cavities, each of the unit cavities comprises a first reflector layer, a spacer layer in contact with the first reflector layer, and a second reflector layer in contact with the spacer layer, the first reflector layer body formed by layering a plurality of first two-layer unit films each composed of an optical thin film with a high refractive index and an optical thin film with a low refractive index in this order, the second reflector layer is a layered body formed by a plurality of second two-layer unit films each composed of an optical thin film with the low refractive index and an optical thin film with the high refractive index arrayed in this order, the spacer layer is composed of a multiple layer layering an even number of optical thin films with the high refractive index, or is composed of a multiple layer layering an even number of optical thin films having the low refractive index accompanied with an odd number of optical thin films having the high refractive index on the both sides, each of the connection layers is composed of a single or multiple layer layering an odd number of optical thin films with the low refractive index, connected in parallel with a phase shifter between an input port and an output port via optical couplers, wherein an electrical length of a phase shifter portion including the optical couplers is substantially different from an electrical length of a transmission path portion before and after the multilayered optical thin-film filter also including the optical couplers by odd multiples of quarter wavelength $\lambda_0$ at a passband center.

2. A method of designing the optical module of the multilayered optical thin-film filter according to claim 1 comprising the steps of:

setting element values of a prototype low-pass filter circuit having transmission and reflection characteristics based on a Hurwitz polynomial of complex frequencies;

leading the prototype low-pass filter circuit to the multilayered optical thin-film filter through a frequency transform and equivalence transformations; and determining structural parameters of the multilayered optical thin-film filter within the given refractive indices of the optical thin-film layers, the numbers of layers for each first and second reflector layers, each spacer layer, and each connection layer.

3. The optical module of the multilayered optical thin-film filter according to claim 1 wherein optical thin films with different refractive indices between an input port and a center of the multilayered optical thin-film filter are disposed symmetrically and/or asymmetrically with those between an output port and the center, and either port face of the multilayered optical thin-film filter is connected onto a transparent substrate.

* * * * *